(12) United States Patent
Siris (10) Patent No.: US 10,304,028 B2
(45) Date of Patent: May 28, 2019

(54) TRAILER UTILIZATION SYSTEMS, METHODS, COMPUTER PROGRAMS EMBODIED ON COMPUTER-READABLE MEDIA, AND APPARATUSES

(71) Applicant: UNITED PARCEL SERVICE OF AMERICA, INC., Atlanta, GA (US)

(72) Inventor: Marc Siris, Sandy Springs, GA (US)

(73) Assignee: UNITED PARCEL SERVICE OF AMERICA, INC., Atlanta, GA (US)

( * ) Notice: Subject to any disclaimer, the term of this patent is extended or adjusted under 35 U.S.C. 154(b) by 0 days.

(21) Appl. No.: 14/667,418

(22) Filed: Mar. 24, 2015

(65) Prior Publication Data

US 2015/0199644 A1 Jul. 16, 2015

Related U.S. Application Data

(63) Continuation of application No. 12/340,233, filed on Dec. 19, 2008, now Pat. No. 9,020,846.

(51) Int. Cl.
*G06Q 10/08* (2012.01)
*G06Q 10/06* (2012.01)

(52) U.S. Cl.
CPC ......... *G06Q 10/0835* (2013.01); *G06Q 10/08* (2013.01)

(58) Field of Classification Search
USPC .................. 235/462.1; 705/28, 335, 400
See application file for complete search history.

(56) References Cited

U.S. PATENT DOCUMENTS

| | | |
|---|---|---|
| 4,611,268 A | 9/1986 | Gotz et al. |
| 5,430,831 A | 7/1995 | Snellen |

(Continued)

FOREIGN PATENT DOCUMENTS

| | | |
|---|---|---|
| CN | 1598850 A | 3/2005 |
| GB | 2461722 A | 1/2010 |

(Continued)

OTHER PUBLICATIONS

"How it Works—Cargo Sensors," General Electric Company, http://web.archive.org/web/20070307032108/http://www.trailerservices.com/veriwise/cargo.html, Mar. 7, 2007

(Continued)

*Primary Examiner* — Oluseye Iwarere
*Assistant Examiner* — Reva R Danzig
(74) *Attorney, Agent, or Firm* — Shook, Hardy & Bacon L.L.P.

(57) ABSTRACT

The disclosed systems, methods, apparatuses, and computer programs embodied on computer-readable media may enable a shipping carrier to determine the utilization of a trailer in a delivery network by receiving and aggregating disparate types and sources of shipping information, including, for example, package billing data from a customer order, scan data from the loading and unloading of packages transported by the trailer, dimensional data received from dimensional scans of packages at carrier shipping hubs, and/or trailer data including the volume of the trailer. Utilization may be determined for each trailer in a carrier delivery network or for a subset of trailers in the network. The determined utilizations may be used to determine the parameters for an optimized delivery network, which may include the addition, elimination, and/or modification of the delivery schedule. Network optimization may be an iterative process that may be continually performed using continually updated trailer utilization statistics.

17 Claims, 8 Drawing Sheets

(56) References Cited

U.S. PATENT DOCUMENTS

| | | | |
|---|---|---|---|
| 5,699,258 A | 12/1997 | Thiel | |
| 6,219,653 B1 | 4/2001 | O'Neill et al. | |
| 6,477,503 B1 | 11/2002 | Mankes | |
| 6,606,604 B1 | 8/2003 | Dutta | |
| 6,622,127 B1 | 9/2003 | Klots et al. | |
| 6,701,299 B2 | 3/2004 | Kraisser et al. | |
| 6,952,628 B2 | 10/2005 | Prutu | |
| 7,015,824 B2 | 3/2006 | Cleveland et al. | |
| 7,137,556 B1 | 11/2006 | Bonner et al. | |
| 7,139,721 B2 | 11/2006 | Borders et al. | |
| 7,158,948 B1 | 1/2007 | Rodriguez et al. | |
| 7,177,825 B1 | 2/2007 | Borders et al. | |
| 7,181,426 B2 | 2/2007 | Dutta | |
| 7,233,907 B2 | 6/2007 | Young | |
| 7,252,227 B2 | 8/2007 | Chase | |
| 7,313,460 B1 | 12/2007 | Prater et al. | |
| 7,363,126 B1 | 4/2008 | Zhong et al. | |
| 7,509,228 B2 | 3/2009 | Bielefeld et al. | |
| 7,624,024 B2 | 11/2009 | Levis et al. | |
| 7,647,233 B2 | 1/2010 | Kadaba et al. | |
| 7,831,439 B1 | 11/2010 | Bryar et al. | |
| 7,925,524 B2 | 4/2011 | Florence | |
| 7,962,422 B1 | 6/2011 | Melechko et al. | |
| 8,068,930 B2 | 11/2011 | Perez et al. | |
| 8,073,723 B1 | 12/2011 | Bilibin et al. | |
| 8,108,321 B2 | 1/2012 | Neal et al. | |
| 8,306,875 B2 | 11/2012 | Schneur | |
| 8,311,850 B2 | 11/2012 | Johnson et al. | |
| 8,386,397 B1 | 2/2013 | Agarwal et al. | |
| 8,407,151 B1 | 3/2013 | Agarwal et al. | |
| 8,407,154 B1 | 3/2013 | Fallows | |
| 8,429,019 B1 | 4/2013 | Yeatts et al. | |
| 8,433,659 B2 | 4/2013 | Johnston et al. | |
| 8,473,425 B1 | 6/2013 | Maurer et al. | |
| 8,554,694 B1 | 10/2013 | Ward et al. | |
| 8,572,002 B2 | 10/2013 | Kadaba | |
| 8,615,473 B2 | 12/2013 | Spiegel et al. | |
| RE45,160 E | 9/2014 | Ferlauto et al. | |
| 8,924,312 B2 | 12/2014 | Kadaba | |
| 9,020,846 B2 | 4/2015 | Siris | |
| 9,047,607 B1 | 6/2015 | Curial et al. | |
| 10,163,119 B1 | 12/2018 | Bolton et al. | |
| 2001/0029473 A1 | 10/2001 | Yamaoka et al. | |
| 2001/0042024 A1 | 11/2001 | Rogers | |
| 2001/0051885 A1 | 12/2001 | Nardulli et al. | |
| 2002/0007299 A1 | 1/2002 | Florence | |
| 2002/0007353 A1* | 1/2002 | Kornacki | G06Q 10/04 705/400 |
| 2002/0016726 A1 | 2/2002 | Ross | |
| 2002/0103724 A1 | 8/2002 | Huxter | |
| 2002/0107820 A1 | 8/2002 | Huxter | |
| 2002/0111914 A1 | 8/2002 | Terada et al. | |
| 2002/0147654 A1 | 10/2002 | Kraisser et al. | |
| 2002/0178023 A1 | 11/2002 | Bjerre et al. | |
| 2003/0009361 A1 | 1/2003 | Hancock et al. | |
| 2003/0036935 A1 | 2/2003 | Nel | |
| 2003/0046133 A1 | 3/2003 | Morley et al. | |
| 2003/0130753 A1 | 7/2003 | Grant et al. | |
| 2003/0200111 A1* | 10/2003 | Damji | G06Q 10/08 705/335 |
| 2004/0030572 A1 | 2/2004 | Campbell et al. | |
| 2004/0151068 A1 | 8/2004 | Carlsruh et al. | |
| 2004/0215480 A1 | 10/2004 | Kadaba | |
| 2004/0249699 A1 | 12/2004 | Laurent et al. | |
| 2005/0080638 A1 | 4/2005 | Maseruka | |
| 2005/0165629 A1 | 7/2005 | Bruns | |
| 2005/0171738 A1 | 8/2005 | Kadaba | |
| 2005/0216319 A1 | 9/2005 | Reblin | |
| 2005/0267791 A1 | 12/2005 | LaVoie et al. | |
| 2005/0278063 A1 | 12/2005 | Hersh et al. | |
| 2006/0041481 A1 | 2/2006 | Stowe | |
| 2006/0261164 A1 | 11/2006 | Bochicchio | |
| 2007/0083410 A1 | 4/2007 | Hanna | |
| 2008/0091342 A1 | 4/2008 | Assael | |
| 2008/0235147 A1 | 9/2008 | Jensen | |
| 2008/0245873 A1* | 10/2008 | Dwinell | G06T 7/60 235/462.41 |
| 2008/0294536 A1 | 11/2008 | Taylor et al. | |
| 2008/0301009 A1 | 12/2008 | Plaster et al. | |
| 2009/0106124 A1 | 4/2009 | Yang | |
| 2009/0164295 A1 | 6/2009 | Sion | |
| 2009/0187489 A1 | 7/2009 | Mallick et al. | |
| 2010/0004960 A1 | 1/2010 | Frankenberg et al. | |
| 2010/0094769 A1 | 4/2010 | Davidson et al. | |
| 2010/0100507 A1 | 4/2010 | Davidson et al. | |
| 2010/0121689 A1 | 5/2010 | Wallace et al. | |
| 2010/0161170 A1 | 6/2010 | Siris | |
| 2010/0169000 A1 | 7/2010 | Overgoor et al. | |
| 2010/0211426 A1 | 8/2010 | Mcclurg | |
| 2010/0312715 A1 | 12/2010 | Esque et al. | |
| 2011/0065458 A1 | 3/2011 | Staton et al. | |
| 2011/0258014 A1 | 10/2011 | Evangelist et al. | |
| 2011/0288958 A1 | 11/2011 | Obasanjo et al. | |
| 2012/0030133 A1 | 2/2012 | Rademaker | |
| 2012/0059729 A1 | 3/2012 | Roa et al. | |
| 2012/0246090 A1 | 9/2012 | Griffith et al. | |
| 2012/0284083 A1 | 11/2012 | Wu et al. | |
| 2012/0303540 A1 | 11/2012 | Marcus et al. | |
| 2013/0006739 A1 | 1/2013 | Horvitz et al. | |
| 2013/0013350 A1 | 1/2013 | McCullough et al. | |
| 2013/0066844 A1 | 3/2013 | Bowers et al. | |
| 2013/0144428 A1 | 6/2013 | Irwin et al. | |
| 2013/0151435 A1 | 6/2013 | Hocquette et al. | |
| 2013/0166359 A1 | 6/2013 | Kadaba | |
| 2013/0262336 A1 | 10/2013 | Wan et al. | |
| 2013/0325737 A1 | 12/2013 | Smalling et al. | |
| 2013/0325741 A1 | 12/2013 | Smalling et al. | |
| 2014/0025464 A1 | 1/2014 | Kadaba | |
| 2014/0052661 A1 | 2/2014 | Shakes et al. | |
| 2014/0095350 A1 | 4/2014 | Carr et al. | |
| 2014/0148944 A1 | 5/2014 | Bailey et al. | |
| 2014/0149244 A1 | 5/2014 | Abhyanker | |
| 2014/0188748 A1 | 7/2014 | Cavoue et al. | |
| 2014/0229338 A1 | 8/2014 | Borders et al. | |
| 2014/0297554 A1 | 10/2014 | Armato | |
| 2014/0330741 A1 | 11/2014 | Bialynicka-Birula et al. | |
| 2015/0081587 A1 | 3/2015 | Gillen | |
| 2015/0178678 A1 | 6/2015 | Carr et al. | |
| 2015/0227890 A1 | 8/2015 | Bednarek et al. | |
| 2015/0248795 A1 | 9/2015 | Davidson | |
| 2015/0269520 A1 | 9/2015 | Knapp et al. | |
| 2015/0294262 A1 | 10/2015 | Nelson et al. | |
| 2015/0302347 A1 | 10/2015 | Fredette | |
| 2015/0356503 A1 | 12/2015 | LaVoie et al. | |
| 2015/0363843 A1 | 12/2015 | Loppatto et al. | |
| 2016/0071056 A1 | 3/2016 | Ellison et al. | |
| 2017/0083862 A1 | 3/2017 | Loubriel | |

FOREIGN PATENT DOCUMENTS

| | | |
|---|---|---|
| WO | WO 2000/068856 A2 | 11/2000 |
| WO | WO 2001/071534 A2 | 9/2001 |
| WO | WO 2013/134417 A1 | 9/2013 |

OTHER PUBLICATIONS

Search Report dated Jun. 19, 2008, PCT/US06/27041, Filed Jul. 12, 2006

United States Patent and Trademark Office, Office Action for U.S. Appl. No. 12/340,233, dated May 11, 2011, 31 pages, U.S.A.

United States Patent and Trademark Office, Office Action for U.S. Appl. No. 12/340,233, dated Dec. 13, 2011, 32 pages, U.S.A.

United States Patent and Trademark Office, Office Action for U.S. Appl. No. 12/340,233, dated Jan. 30, 2014, 31 pages, U.S.A.

United States Patent and Trademark Office, Office Action for U.S. Appl. No. 12/340,233, dated Jun. 25, 2014, 32 pages, U.S.A.

United States Patent and Trademark Office, Notice of Allowance for U.S. Appl. No. 12/340,233, dated Jan. 22, 2015, 21 pages, U.S.A.

"Tap Your Phone, Get Stuff (Including Funding)" [online] [retrieved May 27, 2015]. Retrieved from the Internet: <URL: http://techcrunch.com/2014/04/06/tap-your-phone-get-stuff-including-funding/> (dated Apr. 6, 2014) 8 pages.

(56) References Cited

OTHER PUBLICATIONS

American Airlines, "American Airlines Cargo—Reservations", Aug. 5, 2013 to Sep. 19, 2015, Internet Archive <http://web.archive.org/web/20130805094248/https://www.aacargo.com/learn/reservations.html>, 4 pages.
Browning-Blas, Kristen, "Schwan's frozen-food truckers are driven to make customers' day", *The Denver Post*, Sep. 17, 2008, retrieved from <http://www.denverpost.com/browning/ci_10472479>, on Mar. 20, 2016, 9 pages, U.S.A.
Evans, Kenneth R., et al., "Purchasing Motor Carrier Service: An Investigation of the Criteria Used by Small Manufacturing Firms", *Journal of Small Business Management*, vol. 28.1, p. 39, 1990; retrieved from Google Scholar at <https://www.questia.com/library/journal/1G1-8854587/purchasing-motor-carrier-service-an-investigation>, on Mar. 20, 2016.
U.S. Appl. No. 13/828,652, "Systems and Methods for Synchronized Delivery", Unpublished (filed Mar. 14, 2013), (Chris Bolton, Inventor) (United Parcel Service of America, Inc., assignee).
U.S. Appl. No. 13/964,766, "Methods, Apparatuses and Computer Program Products for Generating Logistics Zones", Unpublished (filed Aug. 12, 2013), (Mark J. Davidson, Inventor) (United Parcel Service of America, Inc., assignee).
U.S. Appl. No. 14/046,172, "Methods, Apparatuses and Computer Program Products for Identifying Duplicate Travel", Unpublished (filed Oct. 4, 2013), (Mark J. Davidson, inventor) (United Parcel Service of America, Inc., assignee).
U.S. Appl. No. 14/859,766, "Systems and Methods for Reserving Space in Carrier Vehicles to Provide on Demand Delivery Services", Unpublished (filed Sep. 21, 2015), (Paul Loubriel, Inventor) (United Parcel Service of America, Inc., assignee).
U.S. Appl. No. 14/988,136, "Systems and Methods for Synchronized Delivery", Unpublished (filed Jan. 5, 2016), (Chris Bolton, Inventor) (United Parcel Service of America, Inc., assignee).
U.S. Appl. No. 14/988,527, "Systems and Methods for Synchronized Delivery", Unpublished (filed Jan. 5, 2016), (Chris Bolton, Inventor) (United Parcel Service of America, Inc., assignee).
U.S. Appl. No. 14/988,536, "Systems and Methods for Synchronized Delivery", Unpublished (filed Jan. 5, 2016), (Chris Bolton, Inventor) (United Parcel Service of America, Inc., assignee).
U.S. Appl. No. 14/988,545, "Systems and Methods for Synchronized Delivery", Unpublished (filed Jan. 5, 2016), (Chris Bolton, Inventor) (United Parcel Service of America, Inc., assignee).
U.S. Appl. No. 14/988,552, "Systems and Methods for Synchronized Delivery", Unpublished (filed Jan. 5, 2016), (Chris Bolton, Inventor) (United Parcel Service of America, Inc., assignee).
U.S. Appl. No. 14/988,561, "Systems and Methods for Synchronized Delivery", Unpublished (filed Jan. 5, 2016), (Chris Bolton, Inventor) (United Parcel Service of America, Inc., assignee).
Wohlsen, Marcus, "How Robots and Military-Grade Algorithms Make Same-Day Delivery Possible", Wired.com, Mar. 19, 2013, 8 pages, retrieved from <http://www.wired.com/category/business/?p=76398>, on Mar. 20, 2016.
Final Office Action received for U.S. Appl. No. 14/664,202, dated Apr. 20, 2018, 18 pages.
Final Office Action received for U.S. Appl. No. 14/664,223, dated Apr. 20, 2018, 18 pages.
Final Office Action received for U.S. Appl. No. 14/988,527, dated Feb. 26, 2018, 13 pages.
Non-Final Office Action received for U.S. Appl. No. 14/694,313, dated Apr. 3, 2018, 15 pages.
Non-Final Office Action received for U.S. Appl. No. 14/859,766, dated Nov. 13, 2018, 36 pages.
Non-Final Office Action received for U.S. Appl. No. 14/988,136, dated Aug. 28, 2018, 19 pages.
Non-Final Office Action received for U.S. Appl. No. 14/988,552, dated Oct. 4, 2018, 17 pages.
Non-Final Rejection dated Nov. 30, 2017 for U.S. Appl. No. 13/828,652.
Final Rejection dated Dec. 19, 2017 for U.S. Appl. No. 14/988,561.
Applicant Initiated Interview Summary (PTOL-413) dated Jan. 24, 2018 for U.S. Appl. No. 14/988,561.
Applicant Initiated Interview Summary (PTOL-413) dated Jan. 24, 2018 for U.S. Appl. No. 13/828,652.
Final Office Action received for U.S. Appl. No. 14/988,552, dated Feb. 5, 2019, 26 pages.
Non-Final Office Action received for U.S. Appl. No. 14/664,202, dated Jan. 24, 2019, 21 pages.
Non-Final Office Action received for U.S. Appl. No. 14/664,223, dated Feb. 7, 2019, 23 pages.

\* cited by examiner

FIG. 8

TRAILER UTILIZATION SYSTEMS, METHODS, COMPUTER PROGRAMS EMBODIED ON COMPUTER-READABLE MEDIA, AND APPARATUSES

CROSS-REFERENCE TO RELATED APPLICATIONS

This patent application is a continuation of U.S. patent application Ser. No. 12/340,233, filed Dec. 19, 2008, which is incorporated herein by reference in its entirety.

BACKGROUND OF THE INVENTION

Technical Field

The following disclosure relates to the field of package delivery and, more particularly, to a system, method, computer program embodied on a computer-readable medium, and apparatus for determining the utilization of each trailer in a plurality of trailers for the purpose of optimizing a delivery network.

Description of Related Art

In the shipping and delivery industry, many shipping carriers attempt to maximize the utilization of trailers and other shipping equipment in which packages are transported. Utilization often has a significant impact on a shipping operation's efficiency and the shipping costs of a carrier. Accordingly, carriers may measure, track, and monitor the utilization of their trailers in order to attempt to maximize utilization.

Past attempts to measure trailer utilization have involved various methods, including, for example, visual inspection of the packages loaded into trailers. Visual inspection is a less than optimal method for determining utilization of a trailer, as the utilization is merely a visual estimate of the amount of space occupied by packages.

Accordingly, it may be desirable to develop a technique for determining trailer utilization that addresses at least some of these and other issues and drawbacks.

BRIEF SUMMARY OF THE INVENTION

The following summary is not an extensive overview and is not intended to identify key or critical elements of the apparatuses, methods, systems, processes, and the like, or to delineate the scope of such elements. This Summary provides a conceptual introduction in a simplified form as a prelude to the more-detailed description that follows.

Embodiments of the present invention provide an improvement by, among other things, providing a trailer utilization and optimization system that may be configured to provide one or more of the following advantages: (1) determine trailer utilization through automated processes, (2) precisely determine trailer utilization, (3) determine trailer utilization promptly after loading and/or transport, (4) provide a cost effective solution for determining trailer utilization. These and other objects and advantages are met by the present invention, which include systems, methods, apparatuses, and computer programs embodied on computer-readable media for determining trailer utilization.

In one embodiment of the present invention, a system for determining the utilization of each trailer in a plurality of trailers is provided. The system includes a dimensional scanner configured to determine one or more dimensions of at least one of the plurality of packages; a scanner configured to scan a unique identification code displayed on each of the plurality of packages in order to identify in which of a plurality of trailers each of the plurality of packages is assigned and to transmit an identified trailer assignment associated with each of the plurality of packages; and a network entity in electronic communication with the computing device, dimensional scanner, and scanner. The network entity is configured to receive from the computing device the data associated with each of the plurality of packages, the one or more dimensions of at least one of the plurality of packages from the dimensional scanner, and the identified trailer assignment associated with each of the plurality of packages from the scanner. Additionally, the network entity is configured to determine one or more dimensions of each of the plurality of packages based at least in part on some combination of the dimensional information of the data received from the computing device and the one or more dimensions of at least one of the plurality of packages received from the dimensional scanner. Furthermore, the network entity is configured to calculate, for each of the trailers in the plurality of trailers, the volume of the packages assigned to the trailer, based at least in part on the identified trailer assignments and the one or more determined dimensions of each of the packages. Moreover, the network entity is configured to determine the utilization of each of the plurality of trailers based at least in part on the calculated volume of the packages assigned to each of the plurality of trailers.

In another embodiment of the present invention, an apparatus for determining the utilization of each trailer in a plurality of trailers is provided. The apparatus includes a processor configured to receive an indication of one or more packages assigned to a trailer, determine one or more dimensions of each package assigned to the trailer, and determine the utilization of the trailer based at least in part on the one or more dimensions of each of the packages assigned to the trailer. Additionally, the processor may be further configured to determine the weight of each package assigned to the trailer and to determine the utilization of each of a plurality of trailers used in a delivery network.

In a further embodiment, a computer program embodied on a computer-readable medium for determining the utilization of each trailer in a plurality of trailers is provided. The computer program embodied on a computer-readable medium includes a first executable portion for receiving an indication of one or more packages assigned to a trailer; a second executable portion for determining one or more dimensions of each package assigned to the trailer; and a third executable portion for determining the utilization of the trailer based at least in part on the one or more dimensions of each of the packages assigned to the trailer. Furthermore, the computer program embodied on a computer-readable medium may include a fourth executable portion for determining the utilization of each of a plurality of trailers used in a delivery network.

In an additional embodiment, a method for determining the utilization of each trailer in a plurality of trailers is provided. The method includes the steps of receiving by a network entity over a wired or wireless communication network an indication of one or more packages assigned to a trailer; determining by the network entity one or more dimensions of each package assigned to the trailer; and determining by the network entity the utilization of the trailer based at least in part on the one or more dimensions of each of the packages assigned to the trailer. In addition the method may further include determining by the network entity the weight of each package assigned to the trailer and determining by the network entity the utilization of each of a plurality of trailers used in a delivery network.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Overview

The present disclosure, according to various embodiments, may enable a shipping carrier to optimize a delivery network by evaluating the utilizations of the respective trailers, trucks, and/or delivery vehicles (collectively referred to as "trailers") operating within the delivery network and realigning the delivery trailers and the schedule accordingly. According to one embodiment, a trailer utilization server may be employed to calculate the utilization of a trailer by determining the percentage of the interior volume of the trailer that is occupied by packages that are being transported in the trailer.

The trailer utilization server may determine the interior volume of the trailer, for example, by accessing a trailer database containing "trailer data," or data identifying, among other things, the interior volume associated with each of the trailers operating within the delivery network. The volume of packages being transported inside of the trailer may be determined by, for example, aggregating package-related data obtained from various different sources at various different times throughout the delivery cycle. In one embodiment, as discussed in more detail below, the package-related data may be stored in one or more databases accessible by the trailer utilization server and may include, for example, "billing data," or data input by a customer at the time of placing an order to ship a package, "dimensional data," or height, length and/or width data obtained from a dimensional scanner as the package is scanned at a hub within the delivery network, and/or the like. According to embodiments of the present invention, the billing, dimensional, and other package-related data may include information such as package dimensions and/or package weight, which may be used by the trailer utilization server to determine the total volume of the packages transported within the trailer. In particular, according to one embodiment, the trailer utilization server may divide the total volume of the packages by the interior volume of the trailer in order to determine the trailer utilization.

This process may be repeated for each trailer operating within the delivery network, until the trailer utilization server may determine the utilization for each trailer. Once the utilization for each trailer has been determined, the trailer utilization server may provide the utilization values to a network optimization server, which may analyze the utilizations and the delivery network schedule in order to determine the parameters for an delivery network, which may include, for example, adding, eliminating, and/or modifying scheduled routes. According to embodiments of the present invention, this network optimization process may be a continual, iterative process.

System Overview

Figure 1:
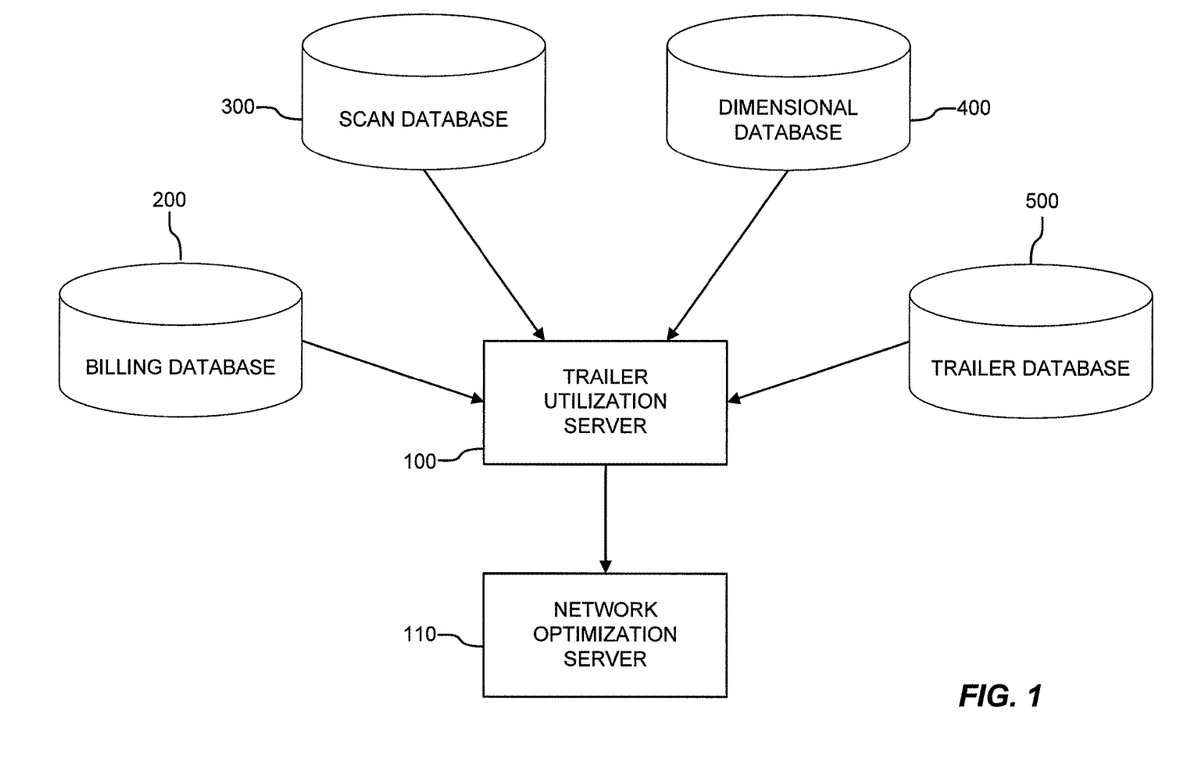
FIG. 1 is a block diagram of one type of system that may be used to determine the utilization of trailers in a delivery network and to determine the parameters for an optimized delivery network, according to one embodiment of the present invention.

Reference is now made to FIG. 1, which provides a block diagram of one type of system that may be used in order to determine the utilization of one or more trailers operating within a delivery network and, where possible, determine the parameters for an optimized delivery network, based at least in part on the determined utilizations. As shown, embodiments of the overall trailer utilization system may include a trailer utilization server 100 and a network optimization server 110, among other components. According to one embodiment, the trailer utilization server 100 and network optimization server 110 may comprise separate servers, or similar network entities, (as shown) in communication with one another over a wired or wireless network, including, for example, a wired or wireless personal area network (PAN), local area network (LAN), wide area network, (WAN), and/or the like. Alternatively, as discussed in more detail below with regard to FIG. 5, the functionality described herein and associated with the trailer utilization server 100 and network optimization server 110, respectively, may be performed by separate application modules stored on the same server, or similar network entity. In addition, as one of ordinary skill in the art will recognize in light of this disclosure, while reference is made throughout this disclosure to a "server," embodiments of the present invention are not limited to a client-server architecture. In contrast, any central or distributed computer or network system may likewise be used to perform the functionality described herein without departing from the spirit and scope of embodiments of the present invention.

According to one embodiment, the trailer utilization server 100 may be configured to receive package-related data from various sources at various different times throughout a package delivery cycle, and use this information to determine the utilization of at least one trailer operating within the delivery network. Once the trailer utilization server 100 determines the utilization for each trailer operating within the delivery network, the trailer utilization server 100 may provide the utilization information to the network optimization server 110, which may be configured to determine the parameters for an optimized delivery network, which may include, for example, eliminating, adding, and/or modifying scheduled routes, among other actions.

According to one embodiment, the package-related data may include, for example, "billing data," "scan data," "dimensional data," "trailer data," and/or the like, each of which is discussed in more detail below. As shown, this and other package-related data may be stored in one or more databases associated with or accessible by the trailer utilization server 100 including, for example, a billing database 200, a scan database 300, a dimensional database 400, and a trailer database 500, among other databases. While shown as separate databases associated with each of the different types of data, as one of ordinary skill in the art will recognize in light of this disclosure, some or all of the package-related data may be stored in the same database associated with or accessible by the trailer utilization server 100.

Figure 2:
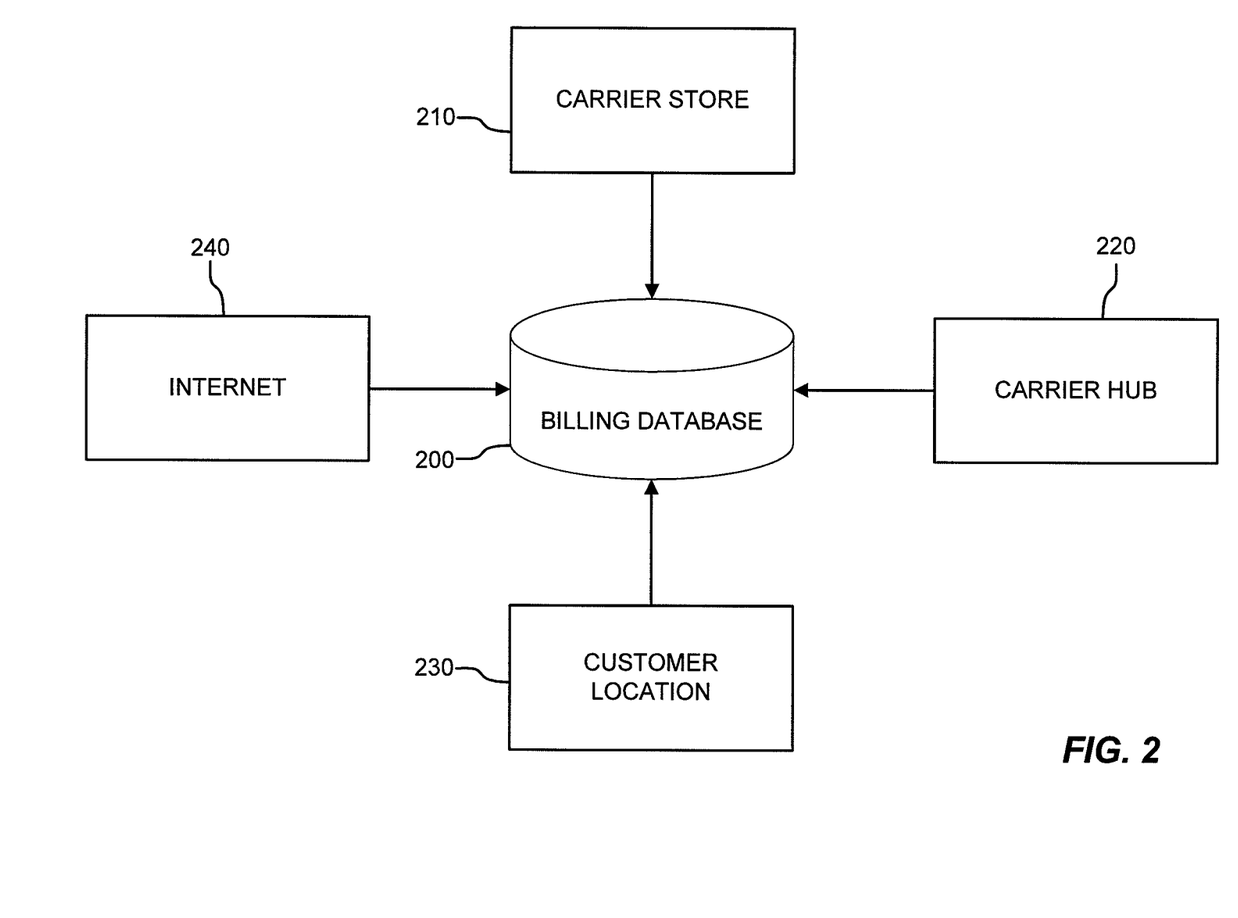
FIG. 2 depicts various sources of billing data input, according to one embodiment of the present invention.

According to one embodiment, "billing data" may refer to information provided by a customer at the time he or she is placing a shipping order. Referring to FIG. 2, an order may be placed in various locations and through various methods, including, for example, at a carrier store 210, at a carrier hub 220, at a customer location 230, and/or through the Internet 240, among other locations and methods. When placing the order, a customer may provide billing information related to the package, including, for example, the destination, billing weight, and/or dimensions of the package, level of service, and/or other related information. The billing weight provided by the customer may correspond to an actual weight of the package or an estimated weight. In particular, a customer who has a scale may weigh the package and provide the actual weight when placing the shipping order. In many instances, the customer may be a commercial customer. If the customer does not have a scale, the customer may, instead, provide an estimated weight of the package. In regard to the dimension of the package, according to one embodiment, the dimensions provided by the customer may include the actual or estimated height, width, and/or length of the package that is being shipped. The information provided by the customer, which is referred to collectively as "billing data," may be input by the customer him- or herself or by a representative associated with the delivery service into a computing device (e.g. personal computer (PC), laptop, etc.). The billing data may thereafter be transmitted (e.g., periodically in batches or in real-time) over a wired or wireless network (e.g., wired or wireless PAN, LAN, WAN, etc.) to and stored in the billing database 200, such that the billing data may be accessed by the trailer utilization server 100. According to one embodiment, in addition to the information provided by the customer, the billing data may further include a tracking number assigned to the package at the time the order is input into the computing device. Like the information discussed above, the tracking number may likewise be transmitted to the billing database 200 over the wired or wireless network.

Figure 3:
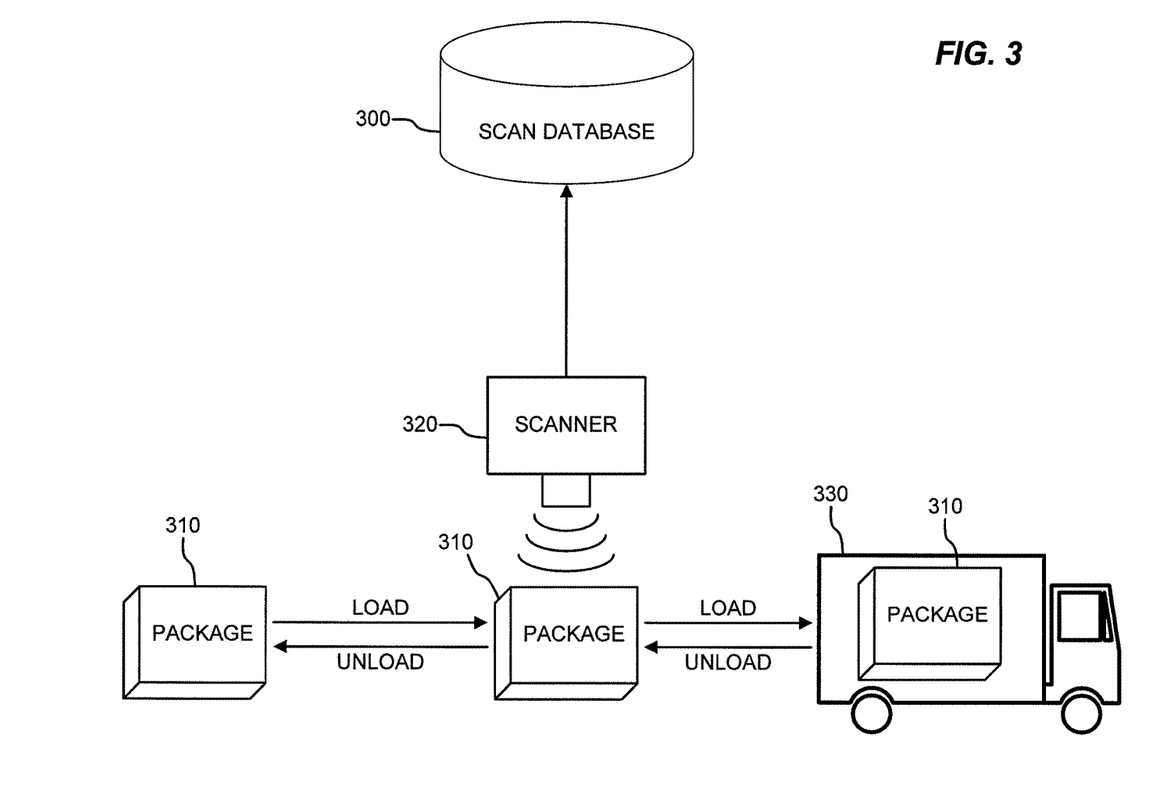
FIG. 3 illustrates a package being scanned as it is loaded onto and removed from a trailer, according to one embodiment of the present invention.

According to one embodiment, "scan data" may refer to information obtained when a package is scanned as the package is loaded into or unloaded from a trailer prior to or following transport. Scan data may include, for example, a tracking number associated with the package, the number of the trailer in which the package is being transported, at both the time of loading into and the time of unloading from the trailer, and/or the like. In particular, referring to FIG. 3, if the package 310 is being loaded into the trailer 330, a scanner 320 may scan the package 310 for a unique identifier code, such as the tracking number. Scanning often occurs at the carrier hub facility but may occur at any location the package is loaded or unloaded. According to one embodiment, the scanner 320 may capture the unique identifier code, along with the number of the trailer 330 into which the package 310 is being loaded, and transmit the captured information to the scan database 300 (e.g., periodically in batches or in real time) over a wired or wireless network (e.g., wired or wireless PAN, LAN, WAN, etc.), where the information may be stored and, therefore, accessible by the trailer utilization server 100. Similarly, as shown in FIG. 3, if the package 310 is being unloaded from the trailer 330, the scanner 320 may scan the package 310 for the unique identifier code, along with the number of the trailer 330 from which the package 310 is being unloaded, and transmit the captured information to the scan database 300 (e.g., periodically in batches or in real time) over a wired or wireless network (e.g., wired or wireless PAN, LAN, WAN, etc.), where in the information may be stored and, therefore, accessible by the trailer utilization server 100. According to one embodiment, the unique identifier code may be a code such as a bar code, MaxiCode, or other type of code that may be employed to store information such as a unique identifier code of a package. The scanner employed may be a scanner that can scan a unique identifier code, such as a bar code or MaxiCode, and decode the unique identifier code. Many well known scanners can read such codes, including, for example, laser scanners and CCD imaging scanners. An example of the type of scanner and decoding system that can be employed in this system may be found in U.S. Pat. Nos. 4,874,936, 4,896,029, and 6,094,509, which are hereby incorporated by reference.

Figure 4:
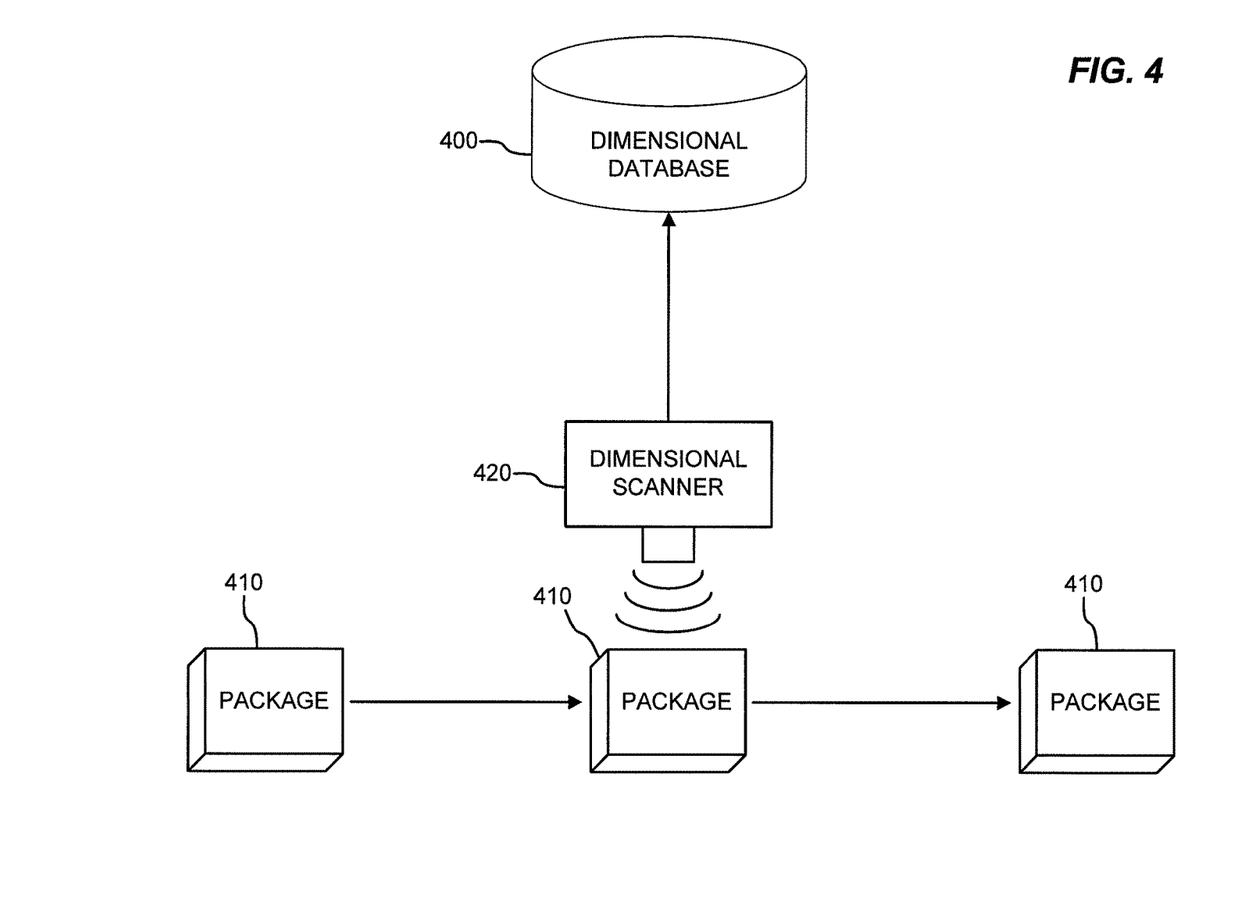
FIG. 4 depicts a package being scanned by a dimensional scanner at a point during the shipping process, according to one embodiment of the present invention.

"Dimensional data" may refer to the height, width, and/or length of the package obtained, for example, when the package is scanned by a dimensional scanner at various and multiple points during the shipment of the package. In particular, as shown in FIG. 4, a dimensional scanner 420, which may be located throughout the shipment process, and according to one embodiment, may be located at carrier hubs, may scan the package 410 to obtain the height, width, and/or length of the package 410. Once captured, the dimensional scanner 420 may transmit the dimensional data (e.g., periodically in batches or in real time) over a wired or wireless network (e.g., wired or wireless PAN, LAN, WAN, etc.) to the dimensional database 400, from which the dimensional data may be accessible by the trailer utilization server 100. According to one embodiment, dimensional data captured by dimensional scanners 420 may serve as a proxy for billing data not provided by the customer or for inaccurate billing data provided by the customer, among other uses. In other words, according to one embodiment of the present invention, information regarding the dimensions of the package may be obtained from the customer at the time of shipping the package (i.e. as billing data) and/or from the dimensional scanner at various points within or during the delivery process (i.e. dimensional data). The dimensional scanner 420 employed may be a scanner that can determine the length, width, and height of a package, among other measurements. The dimensional scanner may utilize optics, sensors, lasers, transducers, mirrors, and/or prisms, among other components, to determine the height, length, and weight of a package. An example of the type of dimensional scanner that can be employed in this system may be found in U.S. Pat. Nos. 6,952,628 and 5,672,815, which are hereby incorporated by reference.

Finally, according to one embodiment, "trailer data" may refer to the physical information about each trailer operating within the delivery network, including, for example, the trailer number, type, length, and/or volume. As noted above, the volume of the trailer may be utilized by the trailer utilization server 100 in determining the percent utilization of the trailer. According to one embodiment, trailer data may be stored in the trailer database 500 located on or accessible by the trailer utilization server 100.

Figure 5:
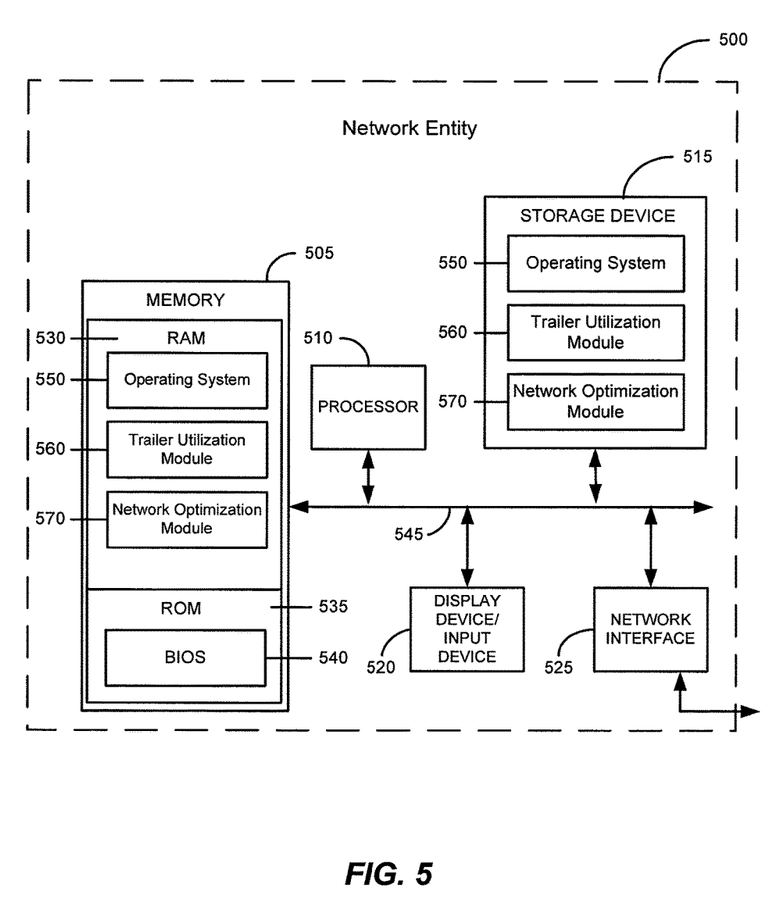
FIG. 5 is a schematic diagram of a central server, according to one embodiment of the present invention.

Referring now to FIG. 5, a schematic diagram of a central server 500, or similar network entity, configured to determine trailer utilization and determine the parameters for an optimized delivery network, according to one embodiment of the invention, is provided. As used herein, the designation "central" merely serves to describe the common functionality the server provides for multiple clients or other computing devices and does not require or infer any centralized positioning of the server relative to other computing devices. As may be understood from FIG. 5, in this embodiment, the central server 500 may include a processor 510 that communicates with other elements within the central server 500 via a system interface or bus 545. Also included in the central server 500 may be a display device/input device 520 for receiving and displaying data. This display device/input device 520 may be, for example, a keyboard or pointing device that is used in combination with a monitor. The central server 500 may further include memory 505, which may include both read only memory (ROM) 535 and random access memory (RAM) 530. The server's ROM 535 may be used to store a basic input/output system 540 (BIOS), containing the basic routines that help to transfer information across the one or more networks.

In addition, the central server 500 may include at least one storage device 515, such as a hard disk drive, a floppy disk drive, a CD Rom drive, or optical disk drive, for storing information on various computer-readable media, such as a hard disk, a removable magnetic disk, or a CD-ROM disk. As will be appreciated by one of ordinary skill in the art, each of these storage devices 515 may be connected to the system bus 545 by an appropriate interface. The storage devices 515 and their associated computer-readable media may provide nonvolatile storage for a personal computer. It is important to note that the computer-readable media described above could be replaced by any other type of computer-readable media known in the art. Such media include, for example, magnetic cassettes, flash memory cards, digital video disks, and Bernoulli cartridges.

A number of program modules may be stored by the various storage devices and within RAM 530. Such program modules may include an operating system 550, a trailer utilization module 560, and a network optimization module 570. The trailer utilization module 560 and network optimization module 570 may control certain aspects of the operation of the central server 500, with the assistance of the processor 510 and the operating system 550. For example, as discussed in more detail below with regard to FIGS. 6-8, according to one embodiment, the trailer utilization module 560 may be configured to receive and aggregate data from multiple different sources at multiple different times throughout a package delivery cycle and to utilize the data to determine the utilization for at least one trailer operating within the delivery network. The network optimization module 570 may receive information from the trailer utilization module 560 and may determine the parameters for an optimized delivery network, which may include, for example, the addition, removal, and/or modification of routes in the delivery schedule. While not shown, according to one embodiment, the storage device 515 and/or memory 505 may further store the trailer database 500, which, as discussed above, may store trailer data that may be used to determine trailer utilization in accordance with embodiments of the present invention.

Also located within the central server 500 may be a network interface 525, for interfacing and communicating with other elements of a computer network. It will be appreciated by one of ordinary skill in the art that one or more of the central server 500 components may be located geographically remotely from other central server 500 components. Furthermore, one or more of the components may be combined, and additional components performing functions described herein may be included in the central server 500. While the foregoing describes the software of embodiments of the invention in terms of modules by way of example, as one of ordinary skill in the art will recognize in light of this disclosure, the software associated with embodiments of the invention need not be modularized and, instead, may be intermingled or written in other non-modularized formats.

Method for Determining Trailer Utilization

Figure 6:
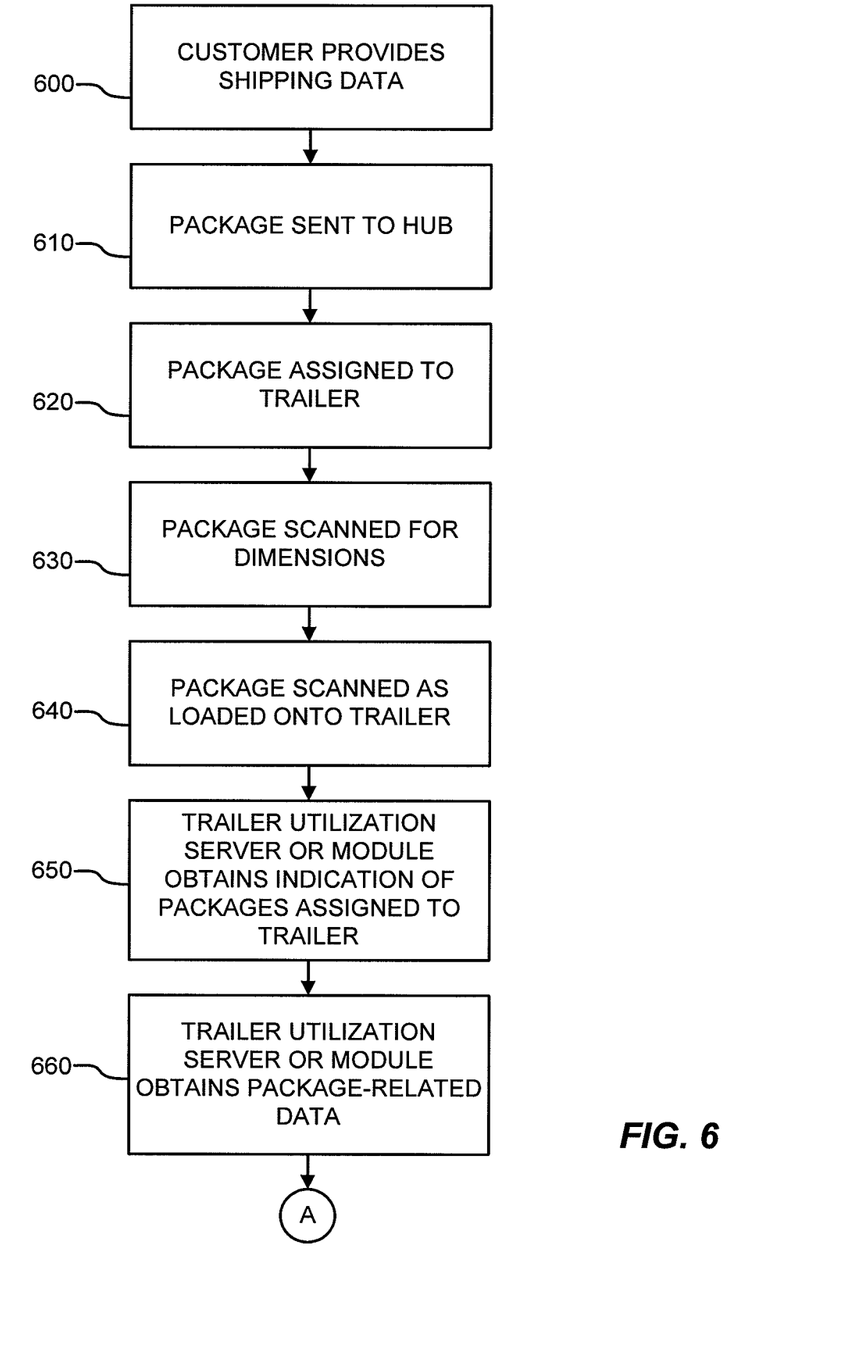
FIGS. 6-7 depict the process flow for determining the utilization of an individual trailer, according to one embodiment of the present invention.
Figure 7:
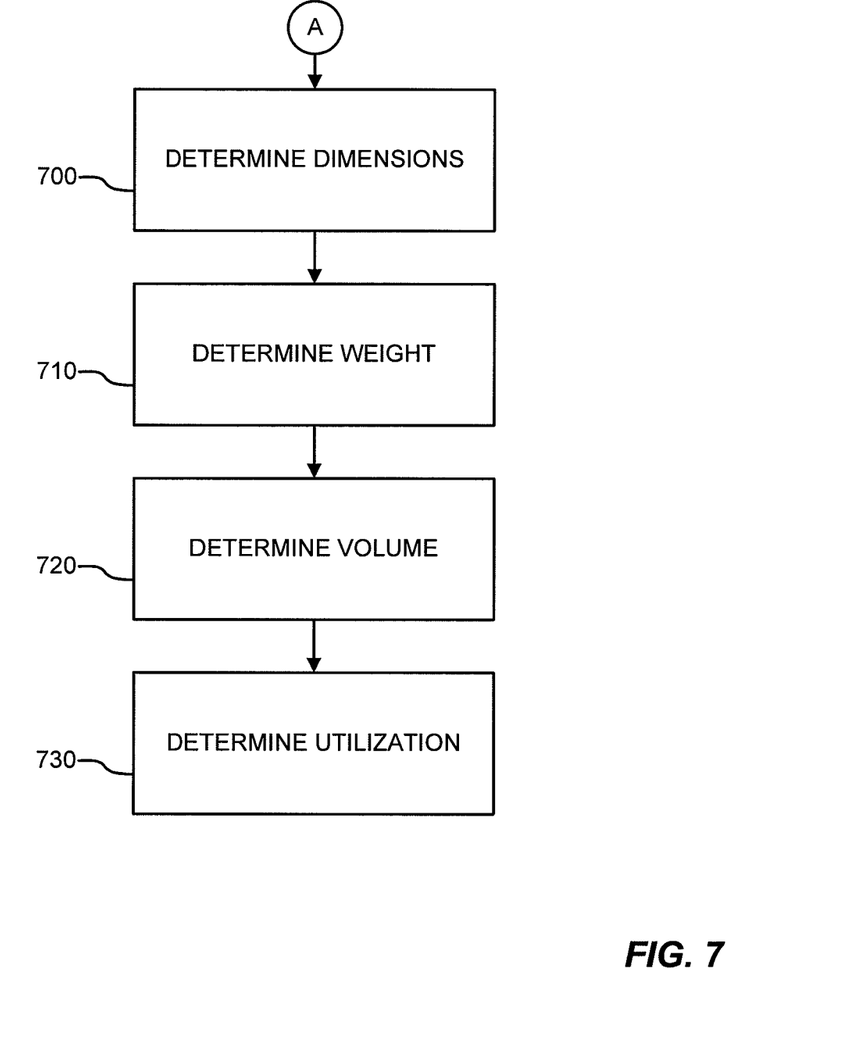

Reference is now made to FIGS. 6-7, which depict a method for determining the utilization of an individual trailer, according to one embodiment of the present invention. As shown, the process may begin when a customer places an order to ship a package and, in so doing, provides shipping data related to the shipment of the package (Block 600). The customer shipping order may be placed in various locations and through various methods, including, for example, at the carrier hub, at the carrier store, at the customer location, and/or through the Internet, among other locations and methods. This shipping data provided by the customer may include, for example, the destination, billing weight, and/or dimensions of the package, level of service, and/or other related information. As discussed above, some or all of the shipping information or data provided by the customer may be input into a computing device (e.g., personal computer (PC), laptop, personal digital assistant (PDA), etc.) and transmitted to (e.g., periodically or in real time via a wired or wireless network) and stored as billing data in the billing database 200 accessible by the trailer utilization server 100.

As depicted in FIG. 6, once the customer places the order and provides shipping data related to the package, the package may, at Block 610, be sent to a hub, where the package may be aggregated with other packages. While at the hub, the package may be assigned to a trailer (Block 620). Also, while at the hub, the package may, at Block 630, be scanned for dimensions by a dimensional scanner. In particular, the dimensional scanner may scan the package for its height, width, and/or length, in order to obtain the dimensional data of the package. As discussed above, upon capturing the dimensional data, the dimensional scanner may transmit (e.g., periodically or in real time via a wired or wireless network) the dimensional data to the dimensional database 400, where the dimensional data may be stored and subsequently accessed by the trailer utilization server 100. According to one embodiment, the package may pass through more than one dimensional scanner during its shipment from origin to destination. Furthermore, the package may be scanned as it is loaded onto the trailer (Block 640). The purpose of scanning the package while it is being loaded onto the trailer may be to generate scan data, which, as discussed above, may be transmitted to and stored in the scan database 300 accessible by the trailer utilization server 100. Scan data may include the number of each trailer in which the package was or is being transported.

Once the package is loaded onto the trailer, the trailer utilization server 100 or, in one embodiment, the trailer utilization module 560 executed by the processor 510 on the central server 500, may, at Block 650, obtain from the scan database 300 an indication of each package that is assigned to the trailer. In addition to obtaining each indication, the trailer utilization server 100 or module 560 may, at Block 660, further obtain package-related data including, for example, billing data from the billing database 200, dimensional data from the dimensional database 400, scan data from the scan database 300, trailer data from the trailer database 500, and/or other similar information related to each package that may be used to determine trailer utilization. In order to determine utilization, the trailer utilization server 100 or module 560 of one embodiment may take into account the volume of each package transported in the trailer, wherein in order to determine volume, the trailer utilization server 100 or module 560 may use, for example, the dimensions and/or weight of each package.

In particular, as shown in FIG. 7, upon obtaining from the scan database 300 the indication of the packages assigned to the trailer, as well as the package-related data from, for example, the billing database 200, dimensional database 400, scan database 300, trailer database 500, and/or the like, the trailer utilization server 100 or module 560 may, at Block 700, first determine the dimensions of each package assigned to the trailer. To determine the dimensions of a package assigned to the trailer, the trailer utilization server or module may obtain the dimensions of the package from the billing data provided by the customer and stored in the billing database 200. As noted above, the dimensions may either be actual or estimated by the customer. If the package is scanned by the dimensional scanner, then the dimensional data stored in the dimensional database 400 may include the dimensions of the package. In this case, the dimensions from the dimensional data may be substituted for the dimensions from the billing data because the dimensions from the dimensional data may be more precise.

Next, the trailer utilization server 100 or module 560 may, at Block 710, determine the weight of each package assigned to the trailer. To determine the weight of the package assigned to the trailer, the trailer utilization server or module may obtain the billing weight of the package from the billing data provided by the customer. The billing weight may be either actual or estimated by the customer. Alternatively, the trailer utilization server or module may instead obtain the weight of the package from dimensional data provided by the dimensional scanner. In particular, package dimensions received by the dimensional scanner may be used to determine a dimensional weight of the package. Dimensional weight may be a calculated measurement and may be the equivalent weight of the package based upon the dimensions of the package. For example, if the customer ships an item in the package that is designed to carry items of greater weight than the item shipped, the dimensional weight of the package may be greater than the actual or estimated weight provided by the customer. In other words, if the dimensions of the package received by the dimensional scanner indicate that the package is a five pound equivalent sized box, the dimensional weight may be five pounds, even if the item shipped weighs only one pound. If the billing weight is not provided in the billing data, the trailer utilization server or module may use the dimensional weight as the weight of the package. Additionally, dimensional weight may be substituted for the billing weight as the weight of the package if the dimensional weight is calculated to be greater than the billing weight. Furthermore, if billing weight is not provided in the billing data and the package has not been scanned by a dimensional scanner in order for a dimensional weight to be calculated, the trailer utilization server or module may use as the weight of the package the average weight of the packages being shipped in the same trailer for which there is weight-related data. If there is no weight-related data for the other packages being shipped in the same trailer, then a weight/volume factor may be used to estimate the weight of the package.

According to one embodiment, the trailer utilization server 100 or module 560 may, at Block 720, determine the volume of each package assigned to the trailer. To determine the volume of each package, the trailer utilization server or module may use the dimensions of the package assigned to the trailer to calculate the volume of the package. If neither the billing data nor the dimensional data include the dimensions of the package, the volume of the package may be estimated by various methods. In some embodiments, the volume may be estimated as the historical average volume of the package, based on the weight of the package. This historical average volume may be obtained by sampling packages of various weights, measuring the volume of each sample package, and determining a relation between the weight of each sample package and its corresponding volume. An example of a system and method for estimating the volume of a package that may be utilized in this system may be found in U.S. application Ser. No. 11/457,015, filed Jul. 12, 2006, and entitled "Systems and Methods for Forecasting Container Density," which is hereby incorporated by reference. Accordingly, if the billing data and dimensional data do not include package dimensions, the trailer utilization server 100 or module 560 may reference a lookup table (e.g., residing in the memory 505 or the memory 515) that may include a mapping of weights to historical average volumes in order to obtain the estimated volume for the package based on the weight of the package.

Once the volume of each package transported by the trailer has been determined, the trailer utilization server or module may determine the utilization of the trailer (Block 730). In particular, the trailer utilization server or module may calculate the total volume of the packages assigned to the trailer to determine the total volume occupied by the packages in the trailer. The trailer utilization server or module may then divide the total volume occupied by the packages in the trailer by the total volume of the trailer, which, as discussed above, may be obtained from the trailer data stored in the trailer database 500. The resulting percentage may be the utilization for the individual trailer. To illustrate, one example of a formula for calculating trailer utilization is as follows:

$$U_t = \frac{\sum_{Pt=1}^{n} V_{Pt}}{V_t},$$

where Pt is a package assigned to trailer t, n is the number of packages assigned to trailer t, $V_{Pt}$ is the volume of a package assigned to trailer t, $V_t$ is the interior volume of trailer t, and $U_t$ is the utilization of trailer t.

Figure 8:
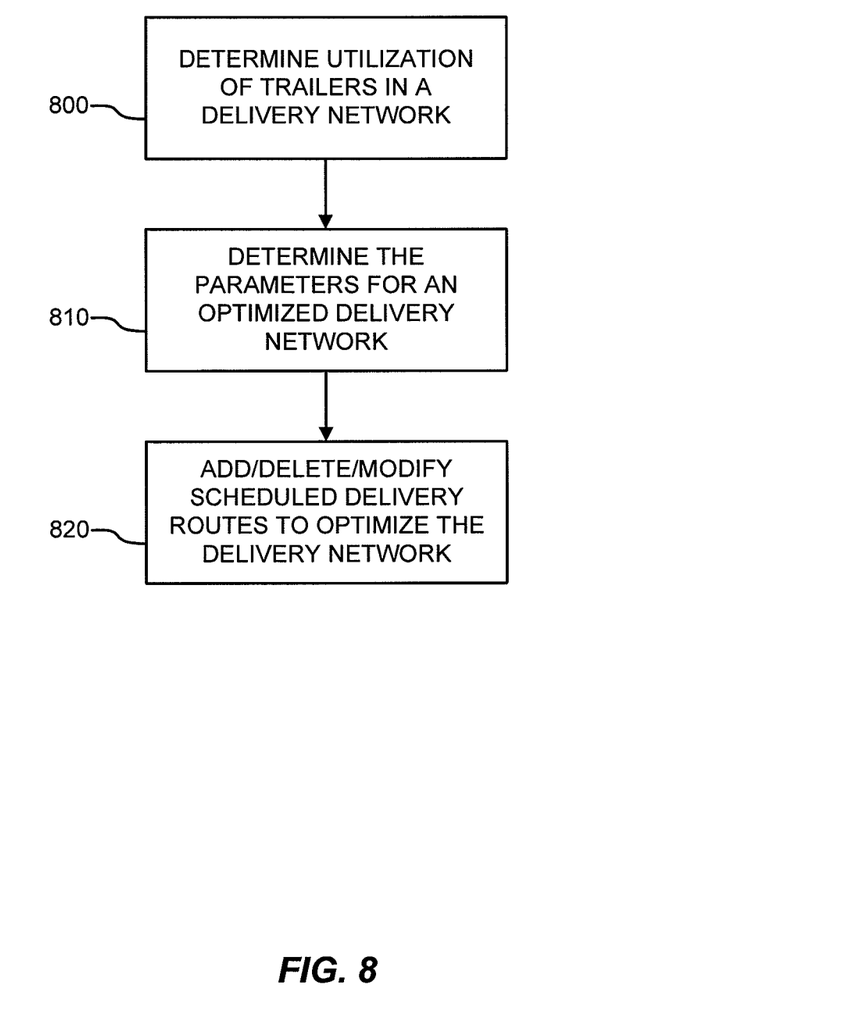
FIG. 8 illustrates the process flow for optimizing the efficiency of a delivery network of trailers, according to one embodiment of the present invention.

Referring to FIG. 8, once the utilization has been determined for the individual trailer, the trailer utilization server or module may, at Block 800, perform the same process for each trailer in the delivery network or in a subset of the delivery network in order to determine the utilization of each trailer in the delivery network or the subset of the delivery network. The determined trailer utilizations may, at Block 810, be analyzed in order to determine the parameters for an optimized delivery network. In particular, in some embodiments, the network optimization server 110 or, in other embodiments, the network optimization module 570 executed by the processor 510 on the central server 500, may obtain the calculated utilizations and may perform various algorithms and procedures to determine the parameters for an optimized delivery network. In other embodiments, the data may be manually analyzed in order to identify opportunities for optimization of the delivery network. To optimize the delivery network, many actions may be taken, including, for example, eliminating routes from the schedule, adding routes to the schedule, altering the times in which routes are scheduled, assigning larger or smaller trailers to specific routes, and/or other actions that may be designed to optimize the delivery network and its schedule (Block 820).

In various embodiments, the optimization process may be an iterative process that may be continually performed in order to continually improve the efficiency of the delivery network. Accordingly, the trailer utilization server or module may continually determine the utilization of the trailers in the delivery network, and the parameters of an optimized delivery network may be continually determined either through the use of the network optimization server or module or through manual optimization.

In other embodiments, if trailer utilization can be determined before the scheduled route of the trailer has begun, then the delivery network may be optimized "on-the-fly." If two trailers, for example, are scheduled to travel from the same origin to the same destination, and the utilization of each the trailers is such that the packages in both trailers could be adequately combined into one of the two trailers, then one of the routes could be eliminated. Additional types of related actions may be taken to preemptively optimize the delivery network.

The present disclosure is not limited solely to the shipping industry. Embodiments of this disclosure may be utilized in any scenario in which a logistics network may be optimized in order to increase efficiency, reduce costs, save time, or other related reasons. Examples may include the airline industry, railroad industry, and public transportation, among other related industries and businesses. In addition, while the foregoing provides an example of the process that may be performed in order to calculate trailer utilization and perform optimization, the order described above of the steps performed in relation to that process is provided for exemplary purposes only and should not be taken in any way as limiting the scope of embodiments of the present invention to the order provided. Alternatively, as one of ordinary skill in the art will recognize in light of this disclosure, the foregoing steps may be performed in multiple different orders and combinations without departing from the spirit and scope of embodiments of the present invention.

As described above and as will be appreciated by one skilled in the art, embodiments of the present invention may be configured as a method or apparatus. Accordingly, embodiments of the present invention may be comprised of various means including entirely of hardware, entirely of software, or any combination of software and hardware. Furthermore, embodiments of the present invention may take the form of a computer program product on a computer-readable storage medium having computer-readable program instructions (e.g., computer software) embodied in the storage medium. Any suitable computer-readable storage medium may be utilized including hard disks, CD-ROMs, optical storage devices, or magnetic storage devices.

Embodiments of the present invention have been described above with reference to block diagrams and flowchart illustrations of methods, apparatuses (i.e., systems) and computer program products. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus, such as processor 510 discussed above with reference to FIG. 5, to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus (e.g., processor 510 of FIG. 5) to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for generating a modified route assigned to a trailer based on a percentage utilization of the trailer, the method comprising:

receiving, over a wired or wireless computer network and at a processor associated with a server computing device of a shipping carrier, a first electronic communication from a dimensional package scanner comprising scanned data generated by the dimensional package scanner, the scanned data indicative of one or more packages assigned to a trailer;

linking, by the processor, the scanned data with trailer data to link the one or more packages with the trailer, wherein the trailer data is indicative of physical characteristics of the trailer;

generating, by the processor, based at least in part on the trailer data and the linked scan data, dimensional data comprising one or more dimensions of each package assigned to the trailer;

determining, by the processor, the utilization of the trailer based at least in part on the dimensional data for each of the packages assigned to the trailer by:

generating a weight estimate of each package assigned to the trailer based at least on obtaining information from a first sensor of the dimensional package scanner;

receiving data indicative of a historical average relationship between package weight and package volume;

generating a volume estimate of each package assigned to the trailer, wherein the volume of at least one package is determined based at least in part on the first sensor and the received data indicative of the historical average relationship between package weight and package volume;

determining a total volume of the packages assigned to the trailer;

dividing the total volume by the available volume associated with the trailer to determine the percent utilization of the trailer;

causing, by the processor, display, via a display device and over the wired or wireless computer network, of data indicative of the utilization of the trailer;

transmitting, by the processor over the wired or wireless computer network and to a network optimization server, data indicative of the utilization of the trailer; and modifying, by the processor, a route assigned to the trailer based on the determined percent utilization of the trailer.

2. The method of claim 1, further comprising receiving the data indicative of the one or more packages assigned to a trailer as the one or more packages are scanned at a hub.

3. The method of claim 1, further comprising receiving one or more actual dimensions from a customer at the time of shipment of a corresponding package.

4. The method of claim 1, further comprising receiving one or more estimated dimensions from a customer at the time of shipment of a corresponding package.

5. The method of claim 1, wherein the one or more dimensions of each package assigned to the trailer comprise height, width, and length.

6. The method of claim 1, further comprising receiving the actual weight of each package assigned to the trailer from a customer at the time of shipment.

7. The method of claim 1, further comprising determining the utilization of each of a plurality of trailers used in a delivery network.

8. A computer-implemented method comprising:

establishing an electronic communication between a trailer utilization server machine and a dimensional package scanner over a wired or wireless communication network, the dimensional package scanner includes at least one or more of: a prism, a laser, and a sensor to obtain multidimensional scan data of one or more packages, the multidimensional scan data including at least one or more of: length, width, and height of the one or more packages;

receiving, by the trailer utilization server machine over the wired or wireless communication network, the multidimensional scan data generated by the dimensional package scanner and indicative of the one or more packages assigned to a trailer, wherein the received data is stored in a memory device and comprises (1) the multidimensional scan data received from the dimensional package scanner associating the one or more packages with the trailer and (2) trailer data generated by a trailer database computing entity and indicative of physical characteristics of the trailer;

linking, by the trailer utilization server machine, the multidimensional scan data stored in the memory device and corresponding to each of the one or more packages assigned to the trailer with the trailer data stored in the memory;

determining, by the trailer utilization server machine and based at least in part on the trailer data and the linked multidimensional scan data, a weight of each package assigned to the trailer;

generating, by the trailer utilization server machine and based at least on a portion of the multidimensional scan data, dimensional data identifying one or more dimensions of each package assigned to the trailer;

receiving, by the trailer utilization server machine, data indicative of a historical average relationship between package weight and package volume;

determining, by the trailer utilization server machine, a volume of each package assigned to the trailer, wherein the volume of at least one package is determined based at least in part on the received data indicative of the historical average relationship between package weight and package volume;

determining, by the trailer utilization server machine, a total volume of the packages assigned to the trailer;

determining, by the trailer utilization server machine, the utilization of the trailer based at least in part on the total volume of the packages assigned to the trailer;

transmitting, by the over the wired or wireless communication network and by the trailer utilization server machine, data indicative of the utilization of the trailer to a network optimization server, wherein the network optimization server modifies a route assigned to the trailer based on the determined percent utilization of the trailer; and by the trailer utilization server machine, causing display, over the wired or wireless communication network and via a display device, of data indicative of the utilization of the trailer.

9. The method of claim 8, wherein the data indicative of one or more packages assigned to a trailer is received from a scanner as the one or more packages are scanned at a hub.

10. The method of claim 8, wherein the one or more dimensions of each package assigned to the trailer comprise one or more actual dimensions received from a customer computing device at the time of shipment of the corresponding package.

11. The method of claim 8, wherein the one or more dimensions of each package assigned to the trailer comprise one or more estimated dimensions received from a customer computing device at the time of shipment of the corresponding package.

12. The method of claim 8, wherein the one or more dimensions of each package assigned to the trailer comprise height, width, and length.

13. The method of claim 8, wherein determining the utilization further comprises:

dividing by the network entity the total volume by an available volume associated with the trailer to determine the percent utilization of the trailer.

14. The method of claim 8, wherein the weight of each package assigned to the trailer comprises an actual weight received from a customer computing device at the time of shipment of the corresponding package.

15. The method of claim 8, wherein the weight of each package assigned to the trailer comprises an estimated weight received from a customer computing device at the time of shipment of the corresponding package.

16. The method of claim 8, wherein the volume of a package assigned to the trailer is determined based at least in part on a historical average package volume based on a weight of the package.

17. The method from claim 8 further comprising determining by the trailer utilization server machine the utilization of each of a plurality of trailers used in a delivery network.

\* \* \* \* \*

UNITED STATES PATENT AND TRADEMARK OFFICE
CERTIFICATE OF CORRECTION

PATENT NO. : 10,304,028 B2
APPLICATION NO. : 14/667418
DATED : May 28, 2019
INVENTOR(S) : Marc Siris Page 1 of 1

It is certified that error appears in the above-identified patent and that said Letters Patent is hereby corrected as shown below:

In the Specification

Column 1, Line 46: remove "Summary" and replace with --summary--.

Column 6, Line 55: remove "minors" and replace with --mirrors--.

In the Claims

Column 15, Line 13 Claim 17: remove "from" and replace with --of--.

Signed and Sealed this
Sixteenth Day of July, 2019

Andrei Iancu
*Director of the United States Patent and Trademark Office*